United States Patent [19]

Monteath et al.

[11] 4,329,684

[45] May 11, 1982

[54] APPARATUS USING A LIGHT SENSING SYSTEM FOR SENSING TIME MODULATED INFORMATION FROM A LIGHT EMITTING DEVICE

[75] Inventors: George D. Monteath, Tadworth; Arthur H. Jones, Horsham, both of England

[73] Assignee: British Broadcasting Corporation, London, England

[21] Appl. No.: 112,377

[22] Filed: Jan. 15, 1980

[30] Foreign Application Priority Data

Jan. 16, 1979 [GB] United Kingdom ............... 7901510

[51] Int. Cl.³ ............................................. G09G 1/14
[52] U.S. Cl. ................................. 340/707; 340/712; 340/794; 178/18; 235/462; 235/471; 235/472
[58] Field of Search .............. 340/706, 707, 708, 794, 340/712; 178/18, 15, 30; 235/462, 471, 472

[56] References Cited

U.S. PATENT DOCUMENTS 3,292,489  12/1966  Johnson et al. .................. 340/707
3,976,992  8/1976  Criscimagna et al. ............. 340/708

*Primary Examiner*—Marshall M. Curtis
*Attorney, Agent, or Firm*—Robert F. O'Connell

[57] ABSTRACT

An electronic control system for a television receiver (12) incorporates a light pen (10) which can be applied to selected portions (16) of the screen (14). These portions (16) are modulated (FIG. 2) at the field scan rate by data inputs such that in successive television fields they are black or white in accordance with the values 1 or 0 of the bits of the data. The data can be used to pre-program the receiver, or alternatively simply stored or printed. The light pen can also be used to read bar codes (36) in a broadcasting periodical (38), and to distinguish whether the light pen is reading the CRT or a bar code a differentiator (42) and asymmetry detector (44) sense whether the light pen output pulses have sharp or decaying trailing edges. In an alternative arrangement the light pen can be used with a light emitting diode such as on a radio receiver or a telephone.

12 Claims, 4 Drawing Figures

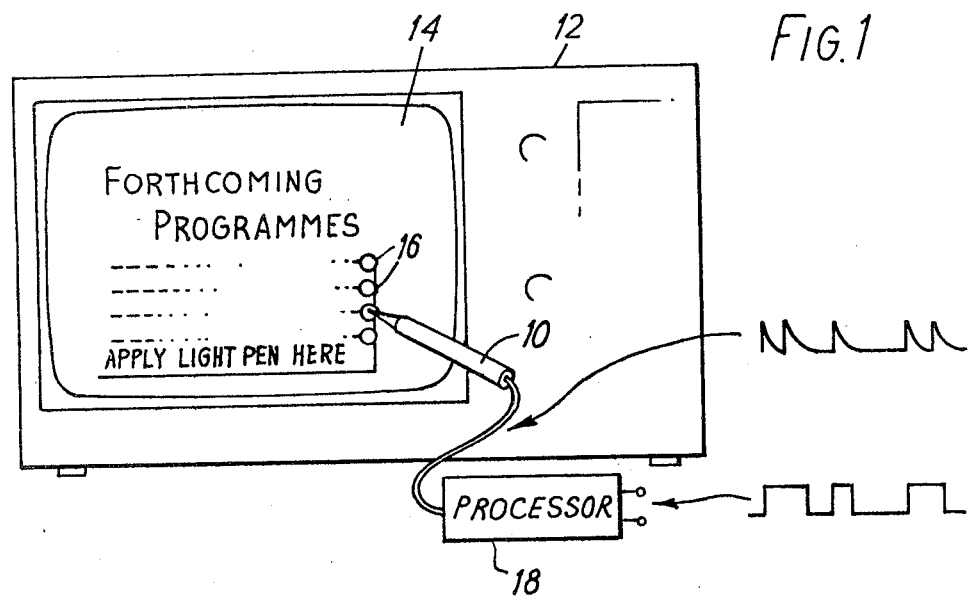
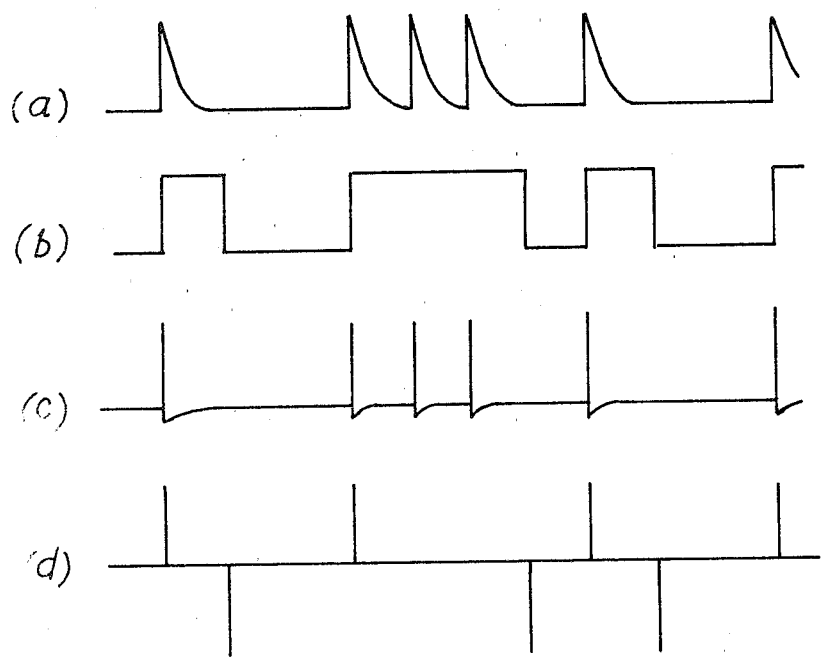

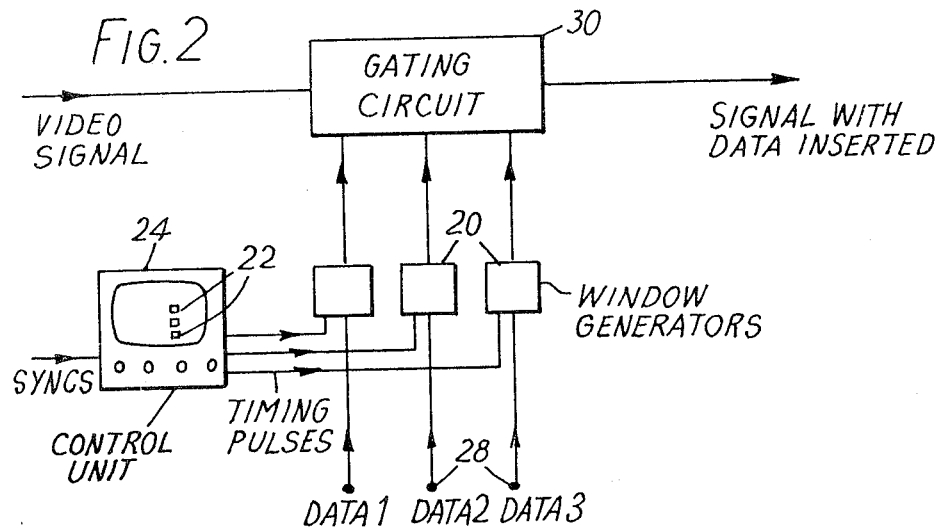
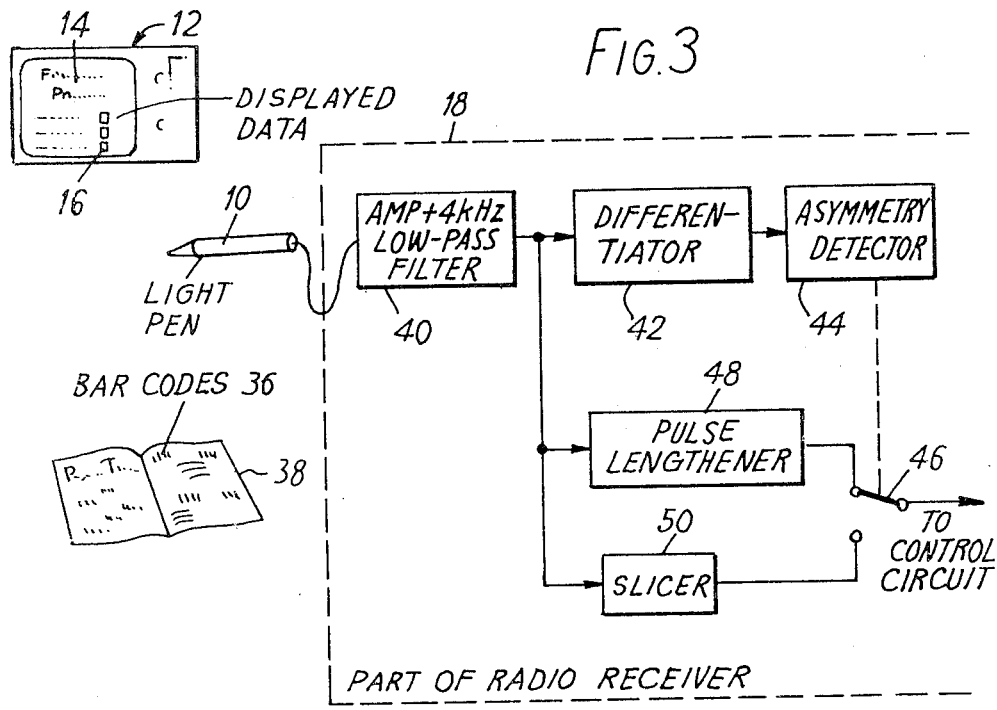

APPARATUS USING A LIGHT SENSING SYSTEM FOR SENSING TIME MODULATED INFORMATION FROM A LIGHT EMITTING DEVICE

BACKGROUND OF THE INVENTION

This invention relates to electronic systems, and is concerned with a system comprising a manipulable electronic light sensor, commonly known as a light pen, which is mounted so that it can selectively be placed in front of an electronic light emitting device for control or information transmission purposes.

It has been proposed to use a light pen to detect the time of arrival of the scanning spot at a particular part of a cathode ray tube (CRT) acting as a television screen or visual display unit (VDU), see for example U.S. Pat. Nos. 3,181,154; 3,492,657 and 4,017,680. In response to this, the operation of data processing circuits can be controlled. In these prior proposals a time/position or coordinate detection system is used to establish the position of the light pen on the CRT, by detecting the instant at which the scanning spot is sensed by the light pen.

SUMMARY OF THE INVENTION

We have appreciated that the combination of an electronic light sensor and an electronic light emitting device can be used differently to provide more flexible and different types of control or data transfer.

The present invention is defined in the appended claims, to which reference should now be made.

In accordance with this invention in a first aspect we provide an electronic control or data transfer system, comprising an electronic light emitting device, a manipulable electronic light sensor adapted selectively to be placed in front of the electronic light emitting device for control or data transfer purposes, means for modulating the light emitting device, and means connected to the light sensor for detecting the modulation in the sensor output to form a pulse train.

The light sensor can then be provided with a pulse shaping circuit which forms a train of pulses representing the sensed signal. The thus-regenerated signal can for example be used immediately for control purposes or can be memorised in a memory for subsequent use.

In accordance with a second aspect of the invention, we provide an electronic control or data transfer system comprising a manipulable electronic light sensor capable of sensing selectively either a bar code or the output of a digitally modulated light emitting device, and electronic means connected to the output of the light sensor and adapted to distinguish by means of the sensor output a sensor output derived from a bar code from a sensor output derived from a digitally modulated light emitting device.

BRIEF DESCRIPTION OF THE DRAWINGS

The invention will now be described in more detail by way of example, with reference to the drawings, in which:

FIG. 1 is a diagrammatic view of a broadcast television receiver with an associated light pen;

FIG. 2 is a block diagram of part of a television transmitter with which the receiver can be used;

FIG. 3 is a block circuit diagram of part of the receiver circuits; and

FIG. 4 is a waveform diagram showing certain waveforms in the circuit of FIG. 3.

DETAILED DESCRIPTION OF THE PREFERRED EMBODIMENTS

When a light pen is held against the face of a cathode ray tube (CRT) displaying a television raster, it is illuminated at those times when the scanning spot passes it. It can receive light from a small patch of phosphor encompassing parts of, say, three or four lines in each field. Thus the received signal consists of a small cluster of sharp impulses followed by a roughly exponential decay as the brightness of that part of the screen decays, the process being repeated when the next field is scanned. For a 50 fields per second signal this is 20 mS later.

We have appreciated that if, in the region examined by the light pen, successive field scans are made with the electron beam modulated by a 50 baud (bits per second) signal, this signal will appear as a modulation superimposed upon the output of the light pen. In particular, the modulation may be of binary form, i.e. the relevant part of the screen may be made to be white or black, as required, during successive fields, to indicate a train of binary digits 1 and 0. By this means the 50 baud signal could easily be detected and simple processing applied to the output of the light pen could render it in conventional non-return-to-zero (NRZ) or any other required form. The processing circuit might conveniently be fed with a field-rate waveform from within the television receiver circuit, this to be used in a resampling process.

FIG. 1 shows a typical example of the system in use. A light pen 10 incorporating a phototransistor is employed in the pre-programming and control of a television receiver 12 as described in British Pat. No. 2,034,995 or corresponding International Patent Application PCT/GB79/00164, to which reference should be made. Upon the television screen 14 is being displayed a list of forthcoming programmes, and against each one a small portion 16 of the screen has been marked out as carrying the required data. The viewer applies his light pen to these portions according to his listening or viewing intentions and the appropriate information is fed via a processor 18 which includes a pulse shaping circuit into the unit which controls his receiver.

FIG. 2 is a block diagram of circuitry for use at a television studio for inserting the necessary data into the television signal. A set of window generators 20 are used which produce patches 22 of plain area which can be positioned as required on the television screen. Each plain area or window is arranged with the aid of a control unit 24 to be adjacent the title of a forthcoming programme being advertised on the screen. The areas are switched or modulated by data received at inputs 28 to appear either white or black on successive fields.

Preferably the light pen output at the receiver is used in accordance with the system described in the aforementioned application to control or programme the receiver for future use, as an alternative to reading bar codes from a broadcasting periodical as is described in that application. In this case, the patches 22 are preferably switched in the same digital format as is used in the bar codes, to enable some at least of the decoding circuitry to be used in common.

The signal conveyed by modulating the patches 22 is substituted for the corresponding portion of the video signal in a gating circuit 30. The coded information typically has a duration of about two seconds, and can be repeated several times over during the course of the programme trail or listing.

FIG. 3 shows in more detail part of the circuits of the receiver of FIG. 1. The light pen 10 can be used either to read bar codes 36 from a broadcasting periodical 38 such as the *Radio Times* or alternatively to pick equivalent information from the television screen 14.

The wave-form produced by the television display will differ from that produced by the bar code, because the former will be influenced by the decay characteristic of the CRT phosphor.

FIG. 4 shows in diagrammatic form the two waveforms expected. That from the CRT, shown at (a), exhibits the familiar exponential decay characteristic of the phosphor; the bit rate is here set at 50 bits, assuming a 50 fields per second scanning rate. The signal from the bar code, however, shown at (b), will be rectangular in form, and its bit rate will range typically from some 35 bit/s to 3.5 Kbit/s depending on the speed at which the bar code is scanned.

If the signal from the CRT is differentiated, it will produce a waveform as shown in (c) which has alternate positive and negative excursions, but the former will be much greater in size than the latter. The differentiated signal from the bar code, on the other hand, shown at (d), will show equal positive and negative excursions.

The circuit of FIG. 3 thus includes an amplifier and 4 kHz low pass filter circuit 40 the output of which is connected to a differentiator 42. The low pass filter removes high frequency components introduced into the CRT derived signal by the line scanning action. An asymmetry detector 44 receives the output of the differentiator 42 and determines whether the mean excursion of the differentiated signal is finite or zero. To this end the asymmetry detector can comprise two peak detectors connected to detect the positive and negative peaks respectively, and an associated resistive mixing arrangement for combining the outputs of the peak detectors. The circuit thus distinguishes whether the light pen output pulses have sharp or decaying trailing edges.

The information obtained from the asymmetry detector is used to operate a switch 46 which selectively brings into circuit either a pulse lengthening circuit 48, e.g. a re-triggerable monostable, as is appropriate for the CRT information, or a simple slicer 50 of known type appropriate for the bar code information. The output of the switch 46 is applied to a decoder of the form usually employed for bar codes, and thence to circuitry of the type described in our aforementioned application.

The invention is not limited to the example described, and many modifications may be made. For example, the light pen may be connected, perhaps via an intermediate store, to transfer data to a hard copy printer to record information available from the television screen. Other forms of display are also possible; they could be as simple as a single light-emitting diode attached to a radio or television receiver, or to a telephone.

What is claimed is:

1. An electronic control or data transfer system, comprising:

an electronic light emitting device;
    means for selectively time modulating the light intensity at one or more selected regions of said light emitting device;
    a manipulable electronic light sensor adapted to be selectively placed at a fixed position in front of said one or more selected regions of said electronic light emitting device; and
    means connected to said light sensor for detecting the time modulation in the sensor output to form a pulse train of time sequential coded information identified with said time modulated light intensity of said selected region of said light emitting device.

2. A system according to claim 1, in which the light emitting device comprises a cathode ray tube one or more selected regions of which are time modulated at a rate related to the field scanning rate.

3. A system according to claim 2 and further including means responsive to said pulse train for providing a control signal for controlling the operation of an apparatus of which the cathode ray tube is a part.

4. A system according to claim 2, in which the cathode ray tube is part of a television receiver.

5. A system according to claim 1, in which the modulating means modulates the light emitting device with digital data.

6. A system according to claim 1, in which the detecting means comprises a pulse shaping circuit.

7. A system according to claim 1, including an electronic storage device connected to the output of the light sensor.

8. A system according to claim 1, in which the light intensity of the light emitting device is digitally time modulated and the detecting means comprises electronic means responsive to the output of said light sensor for distinguishing a sensor output which has been derived from a bar code from a sensor output which has been derived from said digitally time modulated light emitting device.

9. An electronic control or data transfer system comprising:

a manipulable electronic light sensor for selectively sensing either a bar code or the output of a digitally modulated light emitting device; and
    electronic means connected to said light sensor and responsive to the output thereof for distinguishing a sensor output which has been derived from a bar code from a sensor output which has been derived from a digitally modulated light emitting device.

10. A system according to claim 9 in which the output of said light sensor is a pulse signal and said distinguishing means detects whether the pulses of said pulse signal have sharp or decaying trailing edges.

11. A system according to claim 9, in which the distinguishing means comprises a differentiating circuit for differentiating said pulse signal and a circuit responsive to the output of the differentiating circuit for detecting asymmetry therein.

12. A system according to claim 8, in which said detecting means detects whether the pulses of said pulse train from the light sensor have sharp or decaying trailing edges.

* * * * *